May 8, 1951  J. C. HAUN  2,552,374
PLUG VALVE
Filed Jan. 10, 1947  2 Sheets-Sheet 1
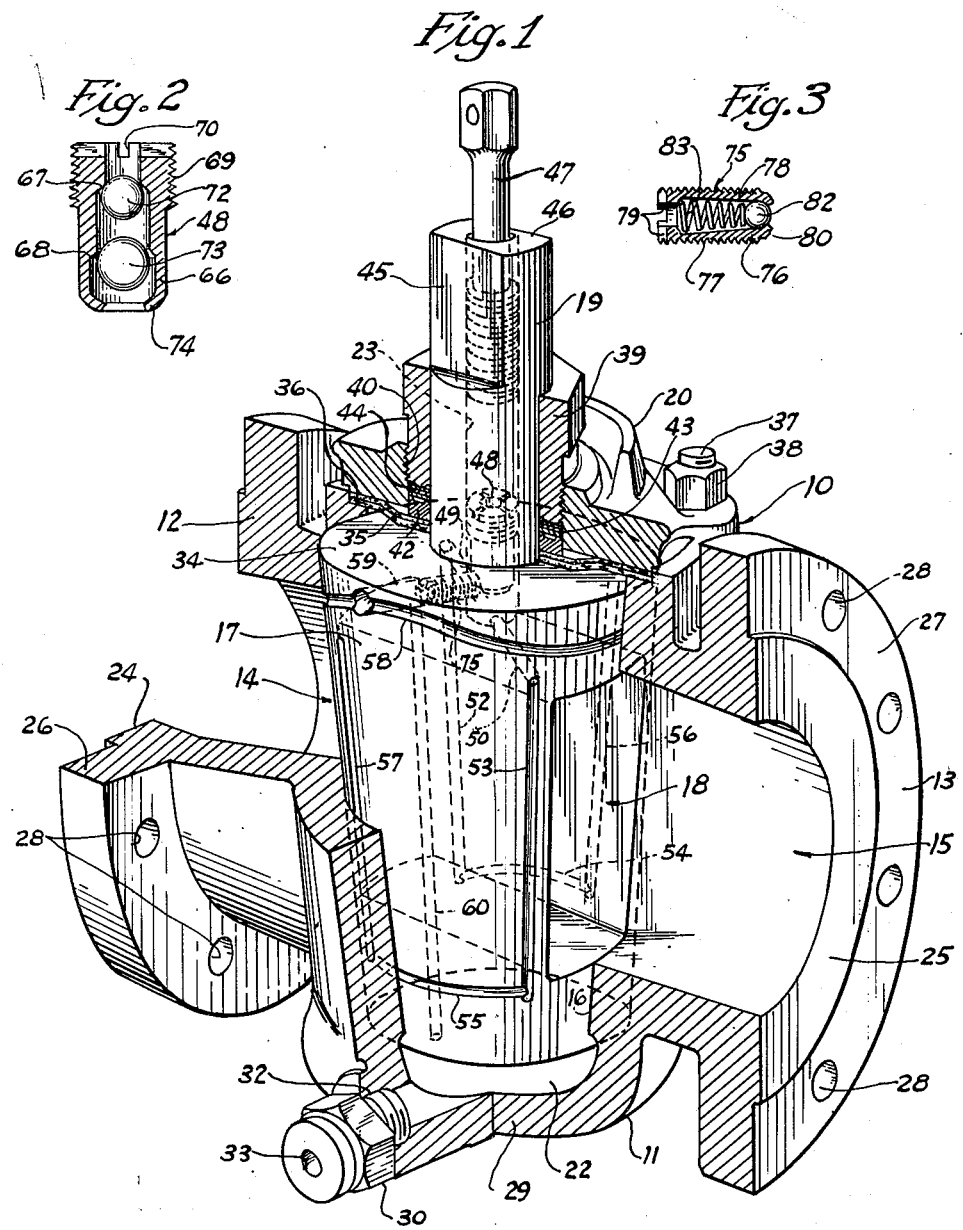
INVENTOR.
Joye C. Haun, Deceased
By Florence Patricia Mills, Executrix
By Albert G. McCaleb
Attorney

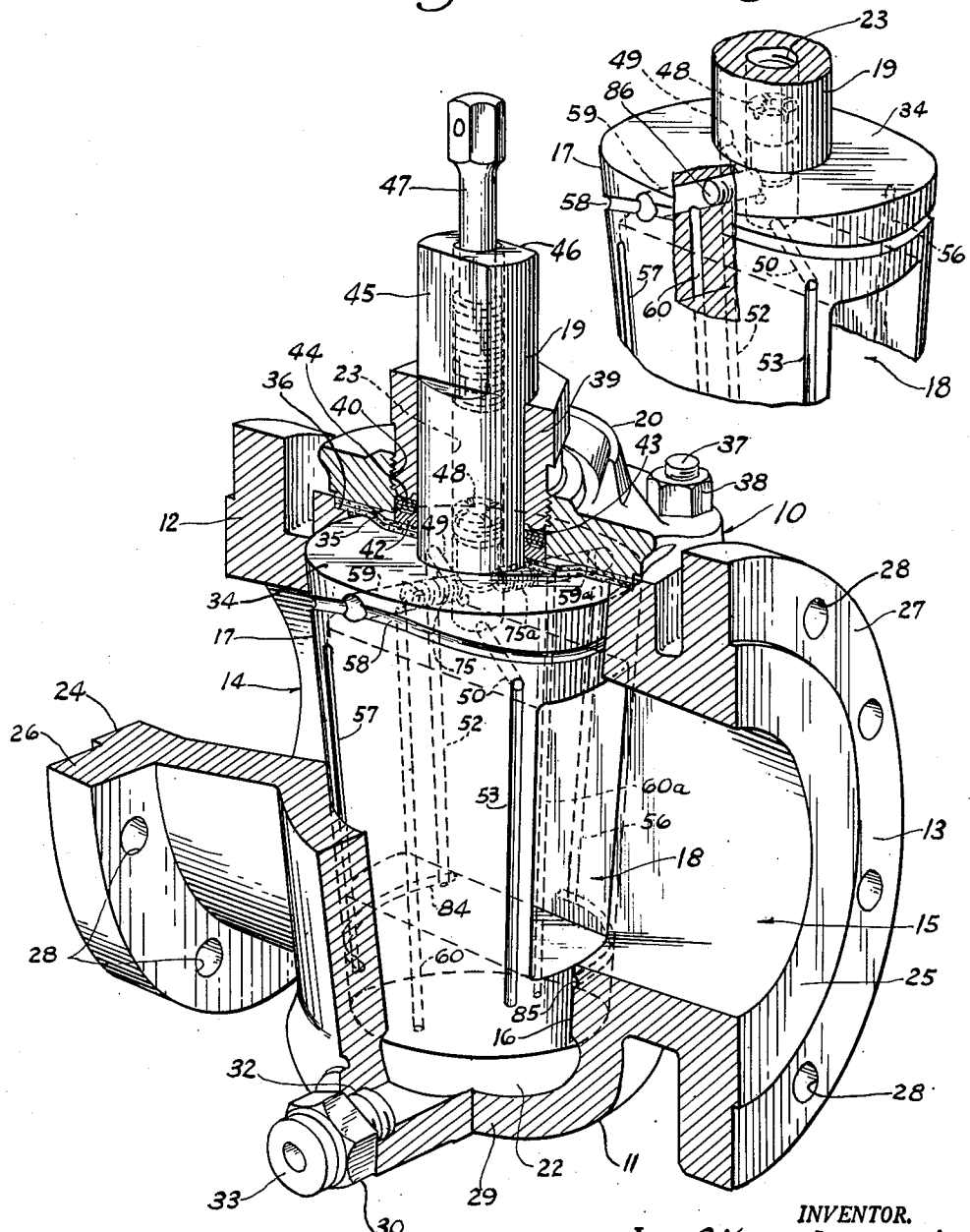

UNITED STATES PATENT OFFICE 2,552,374

PLUG VALVE

Joye C. Haun, deceased, late of San Francisco, Calif., by Florence Patricia Mills, executrix, Wallowa, Oreg., assignor to Florence Patricia Mills, Wallowa, Oreg.

Application January 10, 1947, Serial No. 721,344

4 Claims. (Cl. 251—93)

This invention relates to plug valves, and particularly to such valves of the lubricated type wherein the lubricant has additional functions, such as serving as a sealing medium and as a force transmitting medium for effecting relief of frozen or sticking parts of the valve.

One of the objects of the present invention is to provide a plug valve wherein the flow of lubricant from supply chambers is controlled so that clean and uncontaminated lubricant is fed to the seating surfaces for sealing and lubricating purposes.

As another object, this invention contemplates the provision of a plug valve having a plurality of positions from which internal lubricant pressure may be increased to apply jacking force to the plug to effect its relief when stuck.

It is a further object of the invention to provide a plug valve of the tapered plug type wherein a plurality of lubricant passages in the plug are disposed in opposed and balanced relationship in order to equalize and distribute the forces exerted through application of pressure upon the lubricant.

Another object of this invention is to provide a plug valve wherein a portion of the grooves through which the seating surfaces of the plug are lubricated are in the plug and a portion thereof are in the housing, and wherein the lubricant feed passages to the grooves and the grooves themselves are so relatively disposed and connected that the valve may be lubricated by application of pressure to the lubricant in any position of the plug without extruding lubricant into the flow line controlled by the valve.

The present invention also comprehends the provision of a valve plug for plug type valves which is so constructed and ported that a single stock type of plug is adapted to use with or without a check valve in one of the ports or with said port plugged, which variations, in each instance, establish different operating characteristics for the valve.

Other objects and advantages of the invention will be apparent from the following description and the accompanying drawings, in which similar characters of reference indicate similar parts throughout the several views.

In the two sheets of drawings:

Fig. 1 is a perspective view of a valve embodying a preferred form of the invention and wherein the valve housing is longitudinally sectionalized along angularly disposed planes to show the details of the housing structure in section and the valve plug in elevation;

Figs. 2 and 3 are each sectional views of parts utilized in the valve disclosed in Fig. 1;

Fig. 4 is a view similar to Fig. 1 of a valve embodying the invention in a modified form; and Fig. 5 is a fragmentary perspective view of a modified form of valve plug adapted to use in a valve such as that disclosed in Figs. 1 or 2.

In its more general aspects, the valve 10 which is depicted in Fig. 1 for illustrative purposes has a housing 11 provided at opposite ends with flange-type connecting portions 12 and 13. Opposed ports 14 and 15 provide inlet and outlet openings for the valve and communicate with a frusto-conical bore 16 the axis of which frusto-conical bore is transverse to the axes of the ports 14 and 15. Seated within the frusto-conical bore 16 and adapted to be rotated therein is a frusto-conical valve plug 17 provided with a through bore 18 transverse to the axis of the valve plug and disposed at a position for providing communication between the ports 14 and 15 in the housing when the plug is turned to a position of alignment with the housing ports.

At its upper end the valve plug 17 has a cylindrical stem 19 secured thereto and projecting axially from the end surface of the plug. A cover plate 20 surrounds the stem 19 and covers the frusto-conical bore at the larger end of the plug so that assembly and removal of the plug with respect to the housing may be accomplished by placement and removal of the cover plate. Adjacent the smaller end of the valve plug 17 the housing is formed to provide a lubricant chamber 22 in which chamber lubricant pressure may be built up to effect a jacking force upon the plug to relieve it in the event of its freezing in one position.

As will be more fully explained, the valve stem 19 has therein a cylindrical bore 23 which extends into the end portion of the plug and provides a lubricant chamber. Also the plug is provided with a system of external grooves and passages communicating therewith through which grooves and passages the co-acting frusto-conical seating surfaces of the plug and housing are provided with lubricant for both sealing and lubricating purposes.

Considered more in detail, the flange-type connecting portions 12 and 13 of the valve housing have their seating surfaces 24 and 25 respectively from which flanges 26 and 27 project radially. The usual circumferentially spaced apertures 28 extend axially through the flanges 26 and 27 to accommodate fastening elements such as bolts for securing the valve to adjoining fittings.

Although the outer ends of the ports 14 and 15, as well as the seating surfaces 24 and 25 and the flanges 26 and 27, are desirably circular for convenience in making connections to the usual forms of pipes or pipe fittings, the through bore 18 in the disclosed type of valve is, by preference, substantially rectangular. Thus, the internal surfaces of the ports 14 and 15 are so conformed that they smoothly change in shape between their inner and outer ends so as substantially to align at their inner ends with the ends of the through bore 18.

In the position of the valve shown in Fig. 1, the plug 17 is disposed to provide full communication between the inlet and outlet ports of the valve housing. When rotated 90° from the position shown in Fig. 1, the seating surfaces of the plug completely close the inner ends of the ports 14 and 15 and thus stop all fluid flow through the valve. Since there is sometimes a tendency for plug valves to stick or become frozen in the position to which they have been set, particularly when used in a high pressure system, it is desirable that the frusto-conical plug may be moved outwardly of the housing in the direction of its taper in order to relieve the seating surfaces before the plug is turned. The force of lubricant under pressure within the chamber 22 at the small end of the plug 17 is utilized for effecting the desired axial movement of the plug in the disclosed valve.

At one side of a lower wall 29 of the valve housing a pressure fitting 30 is threaded into an aperture 32 which communicates with the interior of the lubricant chamber 22. This pressure fitting 30 has a lubricant passage 33 and is provided internally with a suitable type of pressure actuated check valve so that lubricant may be introduced into the chamber therethrough but leakage is prevented between the applications of external lubricant pressure.

In order to allow limited axial movement of the plug 17 within the housing and yet maintain a fluid-tight seal at the end of the frusto-conical bore therein, the cover plate 20 is axially spaced from a substantially plane end surface 34 of the plug and a seal is effected between the housing and the plug by parts including a flexible diaphragm 35. The outer edge of the diaphragm 35 is clamped between a shoulder 36 adjacent the frusto-conical bore in the housing and the outer edge of the cover plate 20. In the illustrated valve, studs such as 37 are secured to the housing and project through apertures in the cover plate 20 and are provided with nuts such as 38 for holding the cover plate in place.

A gland 39 fits over the cylindrical surface of the stem 19 and is threaded into a central bore 40 in the cover plate. A pressure ring 42 rests against the surface of the diaphragm 35 adjacent the stem 19 and is movable axially within the bore 40. An inner end surface 43 of the gland 39 is desirably curved and presses against a plurality of flexible resilient rings 44 to bias the pressure ring 42 downwardly against the surface of the diaphragm, thus holding the diaphragm tightly against the surface 34 of the plug. The surface of the pressure ring 42 adjacent the resilient rings 44 is channeled so that a sufficient force upwardly against the bottom of the plug will flex the resilient rings at the channeled surface of the pressure ring, thereby to permit a limited axial movement of the plug.

Due to the tapering of the seating surfaces of the housing and plug, an upward movement of the plug toward its larger end and against the action of the resilient rings 44 frees the plug for turning movement by a wrench or handle fitted onto flattened surfaces 45 and 46 at the end of the stem 19. The gland 39 is tightened to an adjusted position in which it exerts a desired and effective holding pressure against the surfaces of the resilient rings 44.

A plunger 47 is threaded into the outer end of the cylindrical bore 23 in the stem 19. Within the bore 23 and near its lower end is a check valve 48, a preferred form of which is depicted in detail in Fig. 2, which is disposed to function in a manner such that it will permit lubricant under pressure to move downwardly through the stem bore 23, but will check its return movement.

As shown in Fig. 2 the preferred type of check valve 48 for use in the lubricant chamber 23 comprises a housing 66 axially counterbored to provide valve seats 67 and 68 and having a threaded end portion 69 which fits the internal threads of the lubricant chamber. On the threaded end, slots 70 are provided to accommodate a screw driver or similar tool for turning the valve into place within the lubricant chamber. Balls 72 and 73 are movable longitudinally within the counterbores and are of a size to seat against the valve seats 67 and 68 respectively as a result of the lubricant pressure therein. At the end opposite the threads 69, the edge of the housing is rolled in as indicated at 74 to prevent the ball 73 from falling out of the housing.

With the check valve of Fig. 2 mounted in the position indicated within the lubricant chamber, the application of pressure to the lubricant within the chamber by turning the plunger 47 forces lubricant downwardly through the check valve around the balls. However, any upward movement of the lubricant which follows a release of pressure forces the balls to their respective seats and stops the flow. Such a valve is sometimes termed a "gravity operated" check valve.

Below the check valve 48 opposed lateral bores 49 and 50 in the plug 17 provide communication between the stem lubricant chamber and longitudinally extending grooves 52 and 53 in the seating surface of the plug. The grooves 52 and 53 are spaced from, but extend along opposite side edges of, the through bore 18 in the plug. Preferably those grooves are somewhat longer than the side edges of the through bore and the passages 49 and 50 open into the grooves at positions displaced axially of the plug and toward the larger end surface of the plug from the near end surface of the through bore 18. Near the smaller end surface of the plug and below the level of the lower end surface of the through bore 18, circumferential grooves 54 and 55 communicate with the ends of the grooves 52 and 53 respectively opposite the passages 49 and 50 and extend around the seating surface of the plug to a position spaced from but near the opposite ends of the through bore. At their ends which are displaced from the grooves 52 and 53 the grooves 54 and 55 communicate with grooves 56 and 57 respectively which extend longitudinally along opposite side edges of the through bore 18 in spaced relationship thereto.

Through this portion of the system of grooves in the plug 17 lubricant moves outwardly from the lower end of the stem chamber 23 through the passages 49 and 50 to the upper ends of the grooves 52 and 53 respectively. Through the grooves 52 and 53 the lubricant passes to the grooves 54 and 55 respectively and thence upwardly through the grooves 56 and 57 respectively. When the valve is in the open position as shown in Fig. 1, the grooves 52 and 56 are disposed along opposite side edges of the through bore 18 at one end thereof, while the grooves 53 and 57 are disposed along opposite side edges of the through bore 18 at the other end thereof. During turning movement of the plug the lubricant in the grooves is spread across the seating surfaces of the tapered bore of the housing. When the valve is in the closed position, the grooves 53, 55 and 57 frame three sides of the port at one end of the valve and the connected grooves 52, 54 and 56 frame three sides of the port at the other end of the valve. Such framing of the ports improves the sealing of the valve, particularly in its off position and especially if a proper type of lubricant is used for the purpose.

In addition to the aforementioned grooves in the seating surface of the plug, a circumferential groove 58 desirably extends around the plug in a path which is wavy in order that the lubricant from the groove is spread over an area of the seating surfaces which is wider than the groove itself. The groove 58 is axially disposed between the larger end of the plug and the near edges of the through bore 18. A bore 59 extending radially into the plug from the groove 58 connects that groove to the lubricant chamber below the check valve 48 and provides a passage through which lubricant from the chamber flows into and around the groove.

In the preferred valve construction which is disclosed herein the pasage 59 is connected at its mid-portion, and through a passage 60 which extends longitudinally through the plug, to the housing lubricant chamber 22. Furthermore, a spring-urged check valve 75, which is shown in detail in Fig. 3, is threaded into the passage 59 and disposed therein at a position between the lubricant chamber 23 and the passage 60. This check valve comprises a housing 76 threaded along its exterior surface as indicated at 77 and provided with a longitudinal bore 78. One end of the housing includes cross slots 79 for accommodating a screw driver to effect its insertion into the bore 59. The other end of the housing has an edge 80 rolled inwardly to form a seat for a ball 82. A compression spring 83 is mounted within the bore 78 to urge the ball 82 against its seat.

The check valve 75 is so disposed within the bore 59 that pressure of the lubricant within the chamber 23 acts against the ball 82 and spring 83 to move the ball from its seat and permit the flow of lubricant outwardly from the chamber 23 to the outer end portion of the passage 59 and to the passage 60. On the other hand, the check valve 75 prevents the return flow of lubricant from the passage 59 to the lubricant chamber 23.

With the check valve 75 thus installed in the passage 59, the lubricant chambers 23 and 22 are interconnected in such a way that pressure applied to the lubricant within the chamber 23 not only forces lubricant outwardly therefrom and into the connected passages and grooves, but also increases the pressure upon the lubricant in the chamber 22 so that jacking force may be applied to the valve plug by operation of the plunger 47. However, since the lubricant in the chamber 22 is more likely to become contaminated by material from the flow line through the valve than is that in the stem chamber 23, it is desirable to prevent the flow of lubricant from the chamber 22 to the stem chamber 23 through the passage 60. The check valve 75 serves this purpose. It thus insures the flow of clean and uncontaminated lubricant from the stem chamber 23 to the grooves 52, 53, 54, 55, 56 and 57.

The check valve 75 also prevents the forcing of lubricant into the grooves 52, 53, 54, 55, 56 and 57 when jacking force is applied to the valve plug through the introduction of lubricant under pressure into the housing chamber 22.

With the arrangement of grooves shown in Fig. 1 and utilized in combination with the passages and check valves as indicated, the plug may be turned so as to expose the grooves 56 and 57 to the line ports; whereupon the introduction of lubricant into the stem chamber 23 and the application of pressure thereto may be utilized to flush lubricant from the grooves 52, 53, 54, 55, 56 and 57 into the line ports without disturbing the lubricant in the chamber 22. With the valve in such a position, lubricant may also be forced into the housing chamber 22 without extruding that material into the line ports.

In the modified form of the invention which is illustrated in Fig. 4, the general structure of the valve is similar to that shown and described in connection with Fig. 1 and like reference characters refer to similar parts. The distinctive features of this valve will, however, be separately explained. As depicted in Fig. 4, a portion of the grooves from which the seating surfaces of the plug and housing are lubricated are in the plug and a portion are in the seating surfaces of the housing; that is, the circumferential grooves 54 and 55 in the seating surfaces of the plug which are included in the form shown in Fig. 1 have been omitted in the form shown in Fig. 4. In place thereof, circumferential grooves 84 and 85 in the seating surfaces of the housing are utilized to provide communication between certain ones of the grooves when the plug is disposed in predetermined positions relative to the housing.

The grooves 84 and 85 extend circumferentially around the seating surfaces of the housing below the ports 14 and 15 and are of a length such that when the plug is in the open position as shown in Fig. 4, the groove 56 in the plug is connected to and receives lubricant from the groove 53 in the plug through the circumferential groove 85 in the housing. At the same time the groove 57 in the plug is connected to and receives lubricant from the groove 52 in the plug through the circumferential passage 84 in the housing. When the valve is in the closed position the plug is rotated 90° so that the passages 53 and 57 are connected for the passage of lubricant and the passages 52 and 56 are similarly connected. Thus, in either the open or the closed position, pressure applied to the lubricant in the stem chamber 23 forces lubricant through the connected grooves. However, in the intermediate positions of the plug and when the grooves 56 and 57 are exposed to the inlet and outlet ports, they are disconnected from the grooves 52 and 53 so that no lubricant can be extruded into the line when the plug is in an intermediate position, although pressure is applied to the lubricant in the stem chamber 23 during that time.

As a further variation from the valve shown in Fig. 1, the valve of Fig. 4 has diametrically opposed passages 59 and 59a connecting opposite portions of the circumferential groove 58 to the stem lubricant chamber 23. Also passages 60 and 60a extend longitudinally through the plug to connect the mid portions of passages 59 and 59a with the housing lubricant chamber 22. Disposed within the passages 59 and 59a between the lubricant chamber 23 and the passages 60 and 60a respectively are opposed check valves 75 and 75a which permit the flow of lubricant outwardly from the stem lubricant chamber 23 but prevent its flow in the reverse direction.

The provision of the additional connected passages 59a and 60a as well as the opposed check valve 75a in diametrically opposite positions tends to improve the balance of the jacking force applied to the plug when the pressure is increased in the stem lubricant chamber 23. It further balances the flow and pressure applied to the lubricant in the groove 58 so as to tend to prevent the leakage of material from the inlet and outlet ports into the space above the plug when the plug is jacked upwardly to relieve it.

The modified form of valve plug shown in Fig. 5 may be like either of the plugs of Figs. 1 or 4 but has been indicated for illustrative purposes as similar to the plug of Fig. 1. In this modification of the invention a plug 86 is threaded into the passage 53 to a position between the lubricant chamber 23 and the passage 60 to stop the flow of lubricant through that portion of the passage 59 in either direction.

In this instance the circumferential groove 58 receives its lubricant from the housing lubricant chamber 22 and the lubricant flow characteristics of the valve are altered in that the stem and housing lubricant chambers are not connected for the communication of lubricant and pressure therebetween in either direction. Thus the valve plug cannot be jacked by force applied to the lubricant in the stem lubricant chamber 23 upon operation of the plunger 47.

In certain installations the characteristics provided by the valve plug of Fig. 5 are desirable. In such instances the insertion of the plug 86 enables the use of a standard production valve plug in the accomplishment of the altered characteristics.

While a preferred embodiment of this invention has been illustrated, many modifications may be made without departing from the spirit of the invention, and it is not intended that the invention is to be limited to the precise details of the construction set forth, but shall include all of the changes within the scope of the appended claims.

Having thus described the present invention, what is claimed as new and desired to be secured by Letters Patent of the United States is:

1. A lubricated valve comprising, in combination, a housing provided with a frusto-conical bore presenting a seating surface and having inlet and outlet ports communicating with the sides of the bore, a frusto-conical plug having a seating surface fitted into said bore for rotational movement and having a passage therethrough for connecting the inlet and outlet ports when the plug is in a predetermined position relative to the housing and closing said ports when rotated to another position, said plug having a centrally disposed stem projecting from one end thereof, said stem having a lubricant chamber therein for holding a supply of lubricant, means for applying pressure to the lubricant in said chamber, closure means secured to said housing and surrounding said stem, said closure means including sealing means effecting a leak-tight seal for the end of said bore and at the stem, one of said seating surfaces having longitudinally extending lubricant grooves therein disposed in positions such that they are spaced from opposite sides of each end of said passage when the ports are either open or closed, one of said seating surfaces also having therein a circumferentially extending groove connecting the ends of the longitudinally extending grooves remote from the stem in at least one position of the plug relative to the housing, said plug also having a circumferential groove extending in a wave-like path around the plug near the stem end thereof, said housing having a chamber therein at the end of the plug opposite the stem for holding a second supply of lubricant, means providing an inlet for lubricant under pressure to the last mentioned chamber so as to apply lifting force against the end of the plug, said plug having passages therein connecting the stem chamber to certain ones of said longitudinally extending grooves, said plug having an additional passage therein connecting said stem chamber to said wave-like circumferential groove, a longitudinal passage in the interior of the plug connecting said additional passage to the chamber in the housing, and a check valve mounted in said additional passage adjacent the stem lubricant chamber, said check valve being disposed to permit passage of lubricant under pressure from said stem chamber to said circumferential groove and said longitudinal passage and to prevent the flow of lubricant in the reverse direction when pressure is increased in said chamber in the housing.

2. A lubricated valve comprising, in combination, a housing provided with a frusto-conical bore presenting a seating surface and having inlet and outlet ports communicating with the sides of the bore, a frusto-conical plug having a seating surface fitted into said bore for rotational movement and having a passage therethrough for connecting the inlet and outlet ports when the plug is in a predetermined position relative to the housing and closing said ports when rotated to another position, said plug having a stem projecting from one end thereof, said stem having a lubricant chamber therein for holding a supply of lubricant, means for applying pressure to the lubricant in the stem chamber, closure means secured to said housing and surrounding said stem, said closure means including sealing means effecting a leak-tight seal at the end of said bore, one of said seating surfaces having longitudinally extending lubricant grooves therein disposed in positions such that they are spaced from opposite sides of each end of said passage when the ports are either open or closed, one of said seating surfaces also having therein a circumferentially extending groove connecting the ends of the longitudinally extending grooves remote from the stem in at least one position of the plug relative to the housing, said plug also having a top circumferential groove extending around the plug near the stem end thereof, said housing having a chamber therein at the end of the plug opposite the stem for holding a second supply of lubricant, means providing an inlet for lubricant under pressure to the last mentioned chamber so as to apply lifting force against the end of the plug, said plug having passages therein connecting the stem chamber to certain ones of said longitudinally extending grooves, said plug having a lateral passage therein connecting said stem chamber to said top circumferential groove, a longitudinal passage interiorly of the plug for connecting the last mentioned lateral passage to the chamber in the housing, and a check valve mounted in said lateral passage between the stem lubricant chamber and said longitudinal passage, said check valve being disposed to permit flow of lubricant from the stem lubricant chamber and to check the flow of lubricant in the opposite direction when pressure is built up in the housing lubricant chamber.

3. A lubricated valve comprising, in combination, a housing provided with a frusto-conical bore presenting a seating surface and having inlet and outlet ports communicating with the sides of the bore, a frusto-conical plug having a seating surface fitted into said bore for rotational movement and having a passage therethrough for connecting the inlet and outlet ports when the plug is in a predetermined position relative to the housing and closing said ports when rotated to another position, said plug having a stem projecting from one end thereof, said stem having a lubricant chamber therein for holding a supply of lubricant, means for applying pressure to the lubricant in the stem lubricant chamber, closure means secured to said housing and surrounding said stem, said closure means including sealing means effecting a leak-tight seal at the end of said bore, one of said seating surfaces having longitudinally extending lubricant grooves therein disposed in positions such that they are spaced from opposite sides of each end of said passages when the ports are either open or closed, one of said seating surfaces also having therein a circumferentially extending groove connecting the ends of the longitudinally extending grooves remote from the stem in at least one position of the plug relative to the housing, said plug also having a top circumferential groove extending around the plug near the stem end thereof, said housing having a chamber therein at the end of the plug opposite the stem for holding a second supply of lubricant, means providing an inlet for lubricant under pressure to the last mentioned chamber so as to apply lifting force against the end of the plug, said plug having passages therein connecting the stem chamber to certain ones of said longitudinally extending grooves, said plug having opposed lateral passages therein connecting said stem chamber to opposite sides of said top circumferential groove, longitudinal passages in opposite parts of the interior of the plug and segregated from the longitudinal grooves for connecting the last mentioned lateral passages to the chamber in the housing, and a check valve mounted in each of said lateral passages between the stem lubricant chamber and the adjoining longitudinal passage, said check valve being disposed to permit flow of lubricant in one direction and to check the flow in the opposite direction.

4. A lubricated valve comprising, in combination, a housing provided with a bore presenting a seating surface and having inlet and outlet ports communicating with the bore, a plug having a seating surface fitted for rotational movement in said bore and having a passage therethrough for connecting the inlet and outlet ports when the plug is in a predetermined position relative to the housing and closing said ports when rotated to another position, said plug having a stem projecting from one end thereof, said stem having a lubricant chamber therein for holding a supply of lubricant, means for applying pressure to the lubricant in said chamber, closure means secured to said housing, the seating surface of said plug having a circumferential groove at the stem end thereof, at least one of said seating surfaces having additional lubricant grooves therein from which lubricant is spread over the seating surfaces when the plug is rotated in the housing, said housing having a second lubricant chamber therein at the end of the plug opposite the stem, means providing an inlet for lubricant under pressure to the last mentioned chamber so as to apply lifting force against the end of the plug, said plug having a first passage therein connecting the stem lubricant chamber to said circumferential groove, a second passage in the interior portion of the plug connecting the lubricant chamber in the housing to said first passage, and a plug in said first passage for preventing the flow of lubricant therethrough from the stem lubricant chamber.

FLORENCE PATRICIA MILLS.

*Executrix of the Last Will and Testament of Joye C. Haun, Deceased.*

REFERENCES CITED

The following references are of record in the file of this patent:

UNITED STATES PATENTS

| Number | Name | Date |
| --- | --- | --- |
| 1,572,030 | Nordstrom | Feb. 9, 1926 |
| 1,882,287 | Leach | Oct. 11, 1932 |
| 1,961,102 | Fennema | May 29, 1934 |
| 2,026,891 | Haun | Jan. 7, 1936 |
| 2,029,438 | Nordstrom | Feb. 4, 1936 |
| 2,039,523 | Dopp | May 5, 1936 |
| 2,043,863 | Nordstrom | June 9, 1936 |
| 2,048,385 | Jacobsen | July 21, 1936 |
| 2,058,747 | Wilkins | Oct. 27, 1936 |
| 2,122,914 | Nordstrom | July 5, 1938 |
| 2,281,697 | Kerr | May 5, 1942 |
| 2,360,699 | Volpin | Oct. 17, 1944 |